(12) United States Patent
Amberkar et al.

(10) Patent No.: US 8,100,223 B2
(45) Date of Patent: Jan. 24, 2012

(54) SYSTEMS AND METHODS FOR DETERMINING AN ABSOLUTE POSITION OF A MOTOR IN AN ACTIVE FRONT STEERING SYSTEM OF A VEHICLE

(75) Inventors: Sanket S. Amberkar, Ann Arbor, MI (US); Farhad Bolourchi, Novi, MI (US); Scott A. Millsap, Grand Blanc, MI (US); Jon D. Demerly, Byron, MI (US)

(73) Assignee: Nexteer (Beijing) Technology Co., Ltd.

( * ) Notice: Subject to any disclaimer, the term of this patent is extended or adjusted under 35 U.S.C. 154(b) by 1267 days.

(21) Appl. No.: 11/474,756

(22) Filed: Jun. 26, 2006

(65) Prior Publication Data
US 2007/0295895 A1    Dec. 27, 2007

(51) Int. Cl.
*B62D 5/04* (2006.01)

(52) U.S. Cl. .......................................... 180/446; 701/41
(58) Field of Classification Search ................ 180/443, 180/444, 446, 402, 421; 701/41
See application file for complete search history.

(56) References Cited

U.S. PATENT DOCUMENTS

| 6,547,031 | B1 | 4/2003 | Magnus | 180/444 |
| 7,530,422 | B2 * | 5/2009 | Bolourchi et al. | 180/406 |
| 2003/0201136 | A1 * | 10/2003 | Ueno et al. | 180/443 |
| 2007/0132423 | A1 * | 6/2007 | Ajima et al. | 318/719 |

* cited by examiner

*Primary Examiner* — Anne Marie M Boehler
(74) *Attorney, Agent, or Firm* — Cantor Colburn LLP

(57) ABSTRACT

Systems and methods for determining an absolute position of a motor of an active front steering system of the vehicle are provided. In particular, the systems and methods accurately determine an absolute position of the motor upon startup of the active front steering system.

6 Claims, 12 Drawing Sheets

SYSTEMS AND METHODS FOR DETERMINING AN ABSOLUTE POSITION OF A MOTOR IN AN ACTIVE FRONT STEERING SYSTEM OF A VEHICLE

TECHNICAL FIELD

This application relates to systems and methods for determining an absolute position of a motor in an active front steering system of a vehicle

BACKGROUND

Front steering systems have been utilized to assist vehicle operators in steering a vehicle. Front steering system generally includes a handwheel operably coupled through a gear assembly to a rack and pinion assembly that is further operably coupled to a pair road wheels. The motor is operably coupled to the gear assembly for variably adjusting a position of the road wheels relative to a position of the handwheel.

A relative motor position sensor may be operably coupled to the motor to generate signals indicative of a relative position of the handwheel during operation of a vehicle. However, after shutdown of a vehicle, a vehicle operator may move the handwheel to a different operational position. Accordingly, upon startup of the vehicle, a controller receiving the signals from the relative position sensor may not be able to accurately determine an absolute position of the handwheel.

Accordingly, the inventors herein have recognized a need for an improved front steering system that can accurately determine an absolute position of the vehicle handwheel.

SUMMARY

A method for determining an absolute rotational position of a motor in an active front steering system of a vehicle in accordance with an exemplary embodiment is provided. The active front steering system has a handwheel operably coupled through a gear assembly to an output member. The motor has a rotor operably coupled to the gear assembly for adjusting a position of the output member relative of a position of the handwheel. The method includes storing an offset value indicative of a revolution number of the rotor in a memory, upon shutdown of the active front steering system. The method further includes generating a first signal from a motor position sensor indicative of the relative rotational position of the rotor upon startup of the active front steering system. The method further includes determining a first relative rotational position value based on the first signal. The method further includes calculating a first absolute rotational position value indicative of an absolute rotational position of the rotor by summing the first relative rotational position value and the offset value.

A system for determining an absolute rotational position of a motor in an active front steering system of a vehicle in accordance with another exemplary embodiment is provided. The active front steering system has a handwheel operably coupled through a gear assembly to an output member. The motor has a rotor operably coupled to the gear assembly for adjusting a position of the output member relative of a position of the handwheel. The system includes a controller configured to store an offset value indicative of a revolution number of the rotor in a memory, upon shutdown of the active front steering system. The system further includes a motor position sensor operably communicating with the controller. The motor position sensor is configured to generate a first signal indicative of the relative rotational position of the rotor upon startup of the active front steering system. The controller is further configured to determine a first relative rotational position value based on the first signal. The controller is further configured to calculate a first absolute rotational position value indicative of an absolute rotational position of the rotor by summing the first relative rotational position value and the offset value.

A method for determining an absolute rotational position of a motor in an active front steering system of a vehicle in accordance with another exemplary embodiment is provided. The active front steering system has a handwheel operably coupled through a gear assembly to an output member. The motor has a rotor operably coupled to the gear assembly for adjusting a position of an output member relative of a position of the handwheel. The method includes generating a first signal from a first position sensor indicative of an absolute rotational position of the handwheel. The method further includes generating a second signal from a second position sensor indicative of a relative rotational position of the rotor of the motor. The method further includes generating a third signal from a third position sensor indicative of an absolute rotational position of the output member. The method further includes determining a first absolute rotational position value corresponding to the absolute rotational position of the handwheel based on the first signal. The method further includes determining a relative rotational position value corresponding to the relative rotational position of the rotor based on the second signal. The method further includes determining a second absolute rotational position value corresponding to the absolute rotational position of the output member based on the third signal. The method further includes determining a position offset value associated with the rotor based on the first absolute rotational position value and the second absolute rotational position value. The method further includes determining a third absolute rotational position value corresponding to the absolute rotational position of the rotor based on the relative rotational position value of the rotor and the position offset value.

A system for determining an absolute rotational position of a motor in an active front steering system of a vehicle in accordance with another exemplary embodiment is provided. The active front steering system has a handwheel operably coupled through a gear assembly to an output member. The motor has a rotor operably coupled to the gear assembly for adjusting a position of an output member relative of a position of the handwheel. The system includes a first position sensor configured to generate a first signal indicative of an absolute rotational position of the handwheel. The system further includes a second position sensor configured to generate a second signal indicative of a relative rotational position of the rotor of the motor. The system further includes a third position sensor configured to generate a third signal indicative of an absolute rotational position of the output member. The system further includes a controller operably communicating with the first, second, and third position sensors. The controller is configured to determine a first absolute rotational position value corresponding to the absolute rotational position of the handwheel based on the first signal. The controller is further configured to determine a relative rotational position value corresponding to the relative rotational position of the rotor based on the second signal. The controller is further configured to determine a second absolute rotational position value corresponding to the absolute rotational position of the output member based on the third signal. The controller is further configured to determine a position offset value associated with the rotor based on the first absolute rotational position value and the second absolute rotational position value. The controller is further configured to determine a third absolute rotational position value corresponding to the absolute rotational position of the rotor based on the relative rotational position value of the rotor and the position offset value.

A method for controlling an active front steering system of a vehicle in accordance with another exemplary embodiment is provided. The active front steering system has a handwheel operably coupled through a gear assembly to an output member. The motor has a rotor operably coupled to the gear assembly for adjusting a position of the output member relative to a position of the handwheel. The method includes determining a first position error value associated with the rotor based on a desired rotational position value and a measured absolute rotational position value associated with the rotor. The method further includes determining when an operator is turning the handwheel. The method further includes increasing a commanded rotational position value associated with the rotor of the motor toward the desired rotational position value when the operator is turning the handwheel and the first position error value is greater than the threshold value. The method further includes determining a second position error value associated with the rotor based on the commanded rotational position value and a measured absolute rotational position value associated with the rotor. The method further includes determining a motor command value based on the second position error value and a predetermined gain value obtained from a plurality of gain values. The method further includes applying the motor command value to the motor to move the rotor toward a desired rotational position.

A system for controlling an active front steering active front steering system of a vehicle in accordance with another exemplary embodiment is provided. The active front steering system has a handwheel operably coupled through a gear assembly to an output member. The motor has a rotor operably coupled to the gear assembly for adjusting a position of an output member relative of a position of the handwheel. The system includes a controller configured to determine a first position error value associated with the rotor based on a desired rotational position value and a measured absolute rotational position value associated with the rotor. The controller is further configured to determine when an operator is turning the handwheel. The controller is further configured to increase a commanded rotational position value associated with the rotor of the motor toward the desired rotational position value when the operator is turning the handwheel and the first position error value is greater than the threshold value. The controller is further configured to determine a second position error value associated with the rotor based on the commanded rotational position value and a measured absolute rotational position value associated with the rotor. The controller is further configured to determine a motor command value based on the second position error value and a predetermined gain value obtained from a plurality of gain values. The system further includes a motor control circuit operably communicating with the controller. The motor control circuit is configured to apply the motor command value to the motor to move the rotor toward a desired rotational position.

DESCRIPTION OF EXEMPLARY EMBODIMENTS

Figure 1:
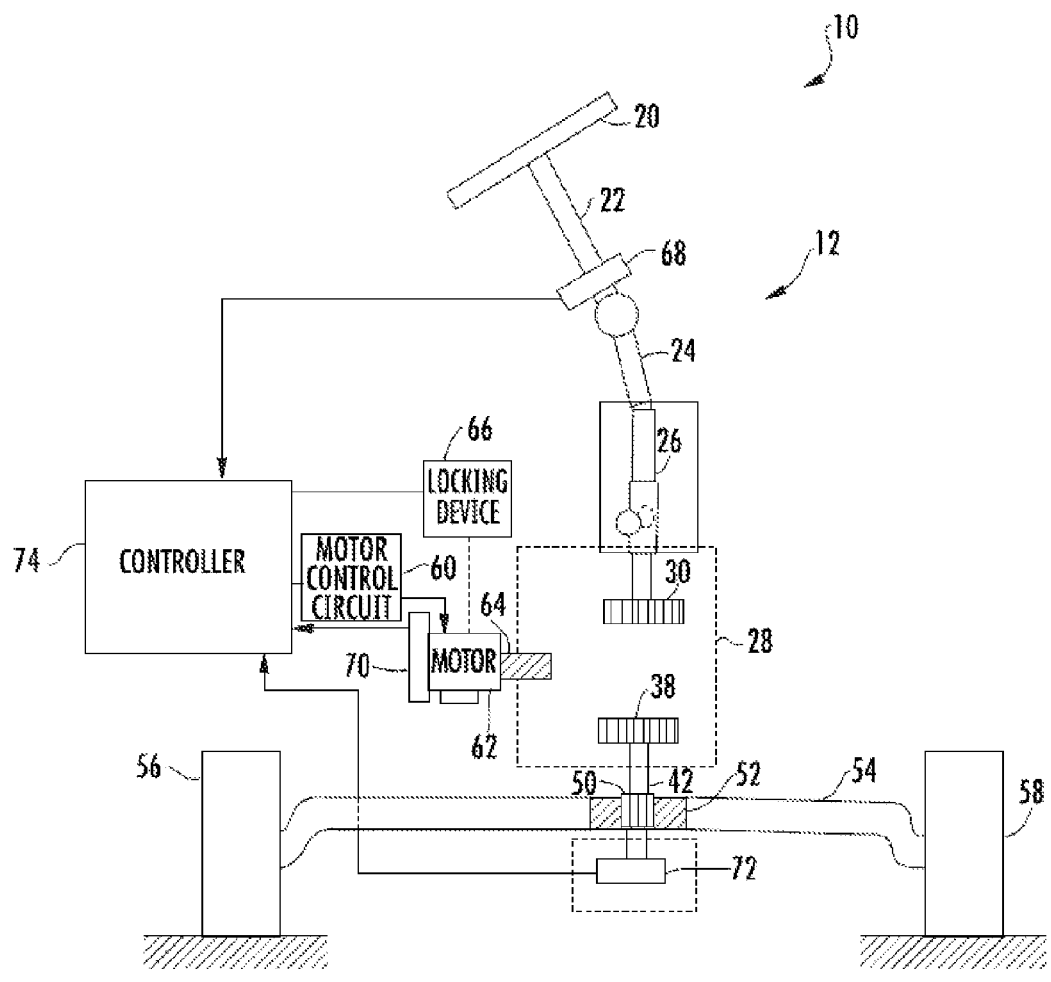
FIG. 1 is a schematic of a vehicle having an active front steering system in accordance with an exemplary embodiment.

Referring to FIG. 1, a vehicle 10 having an active front steering system 12 is illustrated. The active front steering system 12 is provided to allow an operator to steer the vehicle 10 in a desired direction. The active front steering system 12 includes a handwheel 20, an upper shaft 22, an intermediate shaft 24, a tension bar 26, a differential assembly 28, a pinion 50, a steering rack 52, a rack shaft 54, wheels 56, 58, a motor control circuit 60, a motor 62, a motor locking device 66, a handwheel position sensor 68, a motor position sensor 70, a pinion position sensor 72, and a controller 74.

The handwheel 20 is provided to allow operator to turn the upper shaft 22 for steering the vehicle 10. The upper shaft 22 is operably coupled to the intermediate shaft 24 which is further operably coupled to the torsion bar 26. Accordingly, rotation of the handwheel 20 induces rotation of the upper shaft 22, the intermediate shaft 44, and the torsion bar 26. The torsion bar 26 is operably coupled to the differential assembly 28.

The differential assembly 28 is provided to assist the operator in steering the vehicle 10. The differential assembly 28 includes gears 30, 38 and shafts 40, 42. The gear 30 is operably coupled to the torsion bar 26. The gear 38 is coupled to the shaft 42. During operation, rotation of the gear 30 induces rotation of the gear 38 and rotation of the shaft 42.

The pinion 50 is operably coupled to the shaft 42 and is further operably coupled to the steering rack 52. During operation, rotation of the pinion 50 induces the steering rack 52 to move the rack shaft 54 for moving the vehicle wheels 56, 58 in a desired direction.

The motor control circuit 60 is provided to generate motor control signals for controlling operation of the motor 62, in response to signals received from the controller 74. The motor 62 is provided to rotate a rotor 64 to generate an assist torque for assisting an operator in moving the wheels 56, 58 in a desired direction. In an alternative embodiment of the motor 62, the motor 62 is configured to not rotate upon de-energization of the motor 62.

The locking device 66 is operably coupled to the motor 62 and is provided to lock a position of the rotor 64 at a desired position, in response to a control signal from the controller 74. In particular, the locking device 66 is utilized to lock the position of the rotor at the desired position, during shutdown of the active front steering system 12 or when an operational fault condition has occurred in the active front steering system 12.

The handwheel position sensor 68 is provided to generate a signal indicative of an absolute position of the handwheel 20 which is received by the controller 74. The handwheel position sensor 68 may be operably coupled to the upper shaft 22.

The motor position sensor 70 is provided to generate a signal indicative of a relative position of the rotor 64 which is received by the controller 74. In an exemplary embodiment, the motor position sensor 70 generates a signal indicative of a position of the rotor 64 which is accurate to within one revolution of the rotor 64. Of course, in an alternative embodiment, the motor position sensor 70 could generate a signal that is merely indicative of the relative position of the rotor 64.

The pinion position sensor 72 is provided to generate a signal indicative of an absolute position of the pinion 50 which is received by the controller 74. The pinion position sensor 72 may be disposed proximate either the shaft 42 or the pinion 50.

The controller 74 is provided to control operation of the active front steering system 12. In particular, the controller 74 is operably coupled to the handwheel position sensor 68, the motor position sensor 70, and the pinion position sensor 72 and receives position signals from the position sensors. Further, the controller 74 is configured to generate control signals that the motor control circuit 60 utilizes to control the motor 62. Further, the controller 74 is configured to generate control signals to induce the locking device 66 to either lock a position of the rotor 64 at a predetermined position or to unlock the rotor 64 so that the rotor 64 can rotate. The controller 74 includes a CPU (not shown) and a memory for storing executable instructions that implement the methods described herein.

Figure 2:
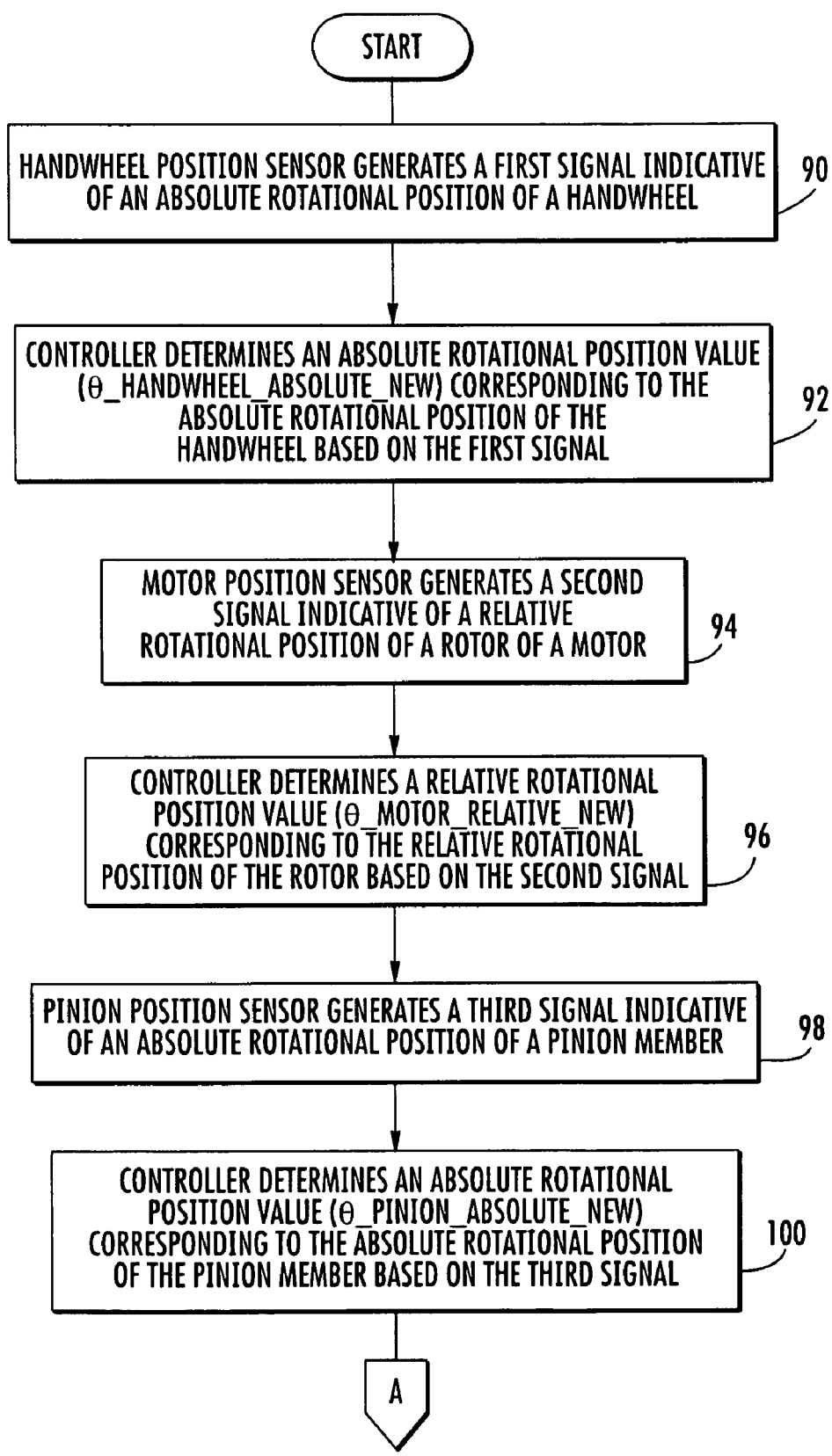
FIGS. 2-3 are flowcharts of a method for determining an absolute rotational position value of a motor in accordance with another exemplary embodiment, utilized in the active front steering system of FIG. 1.
Figure 3:
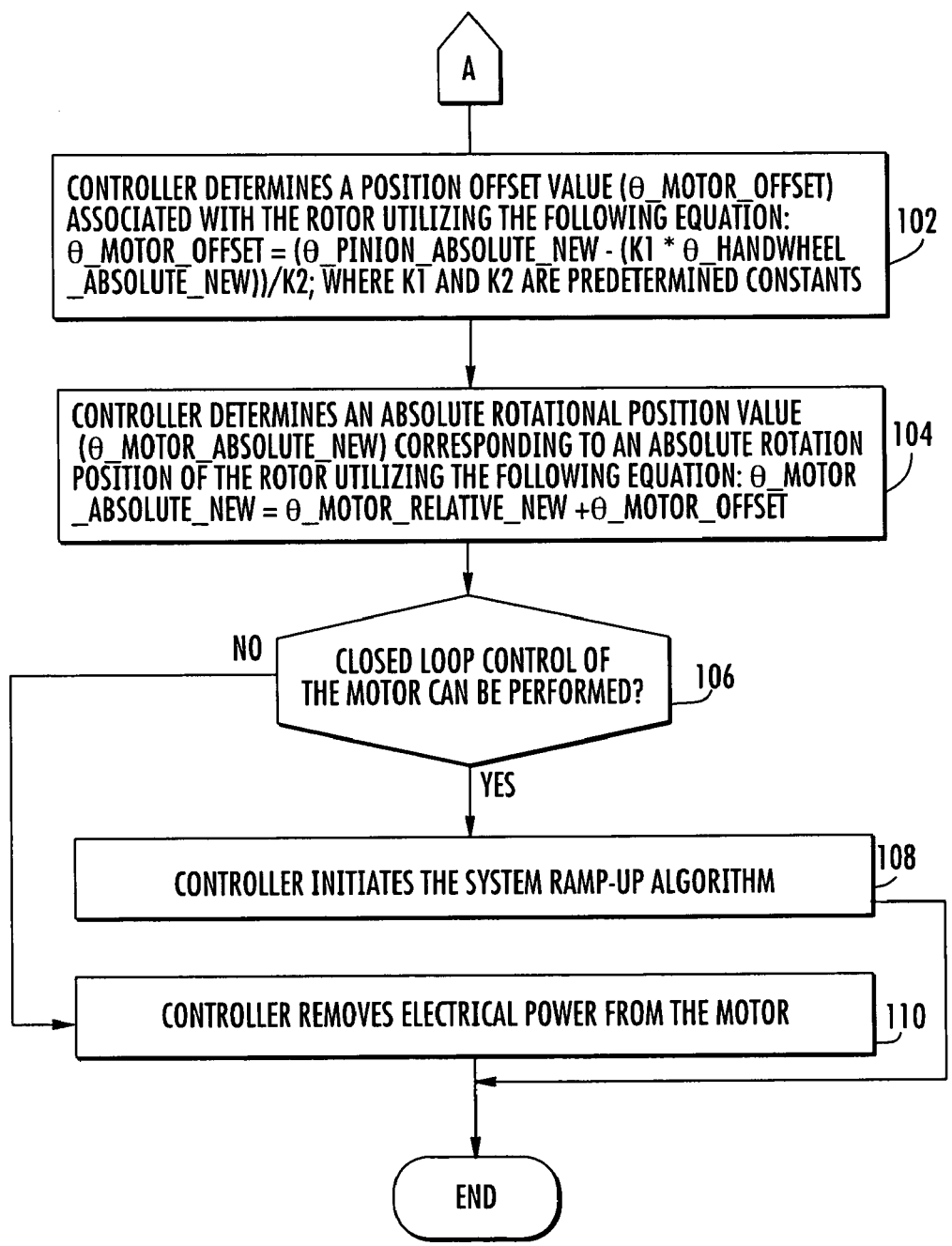
Figure 4:
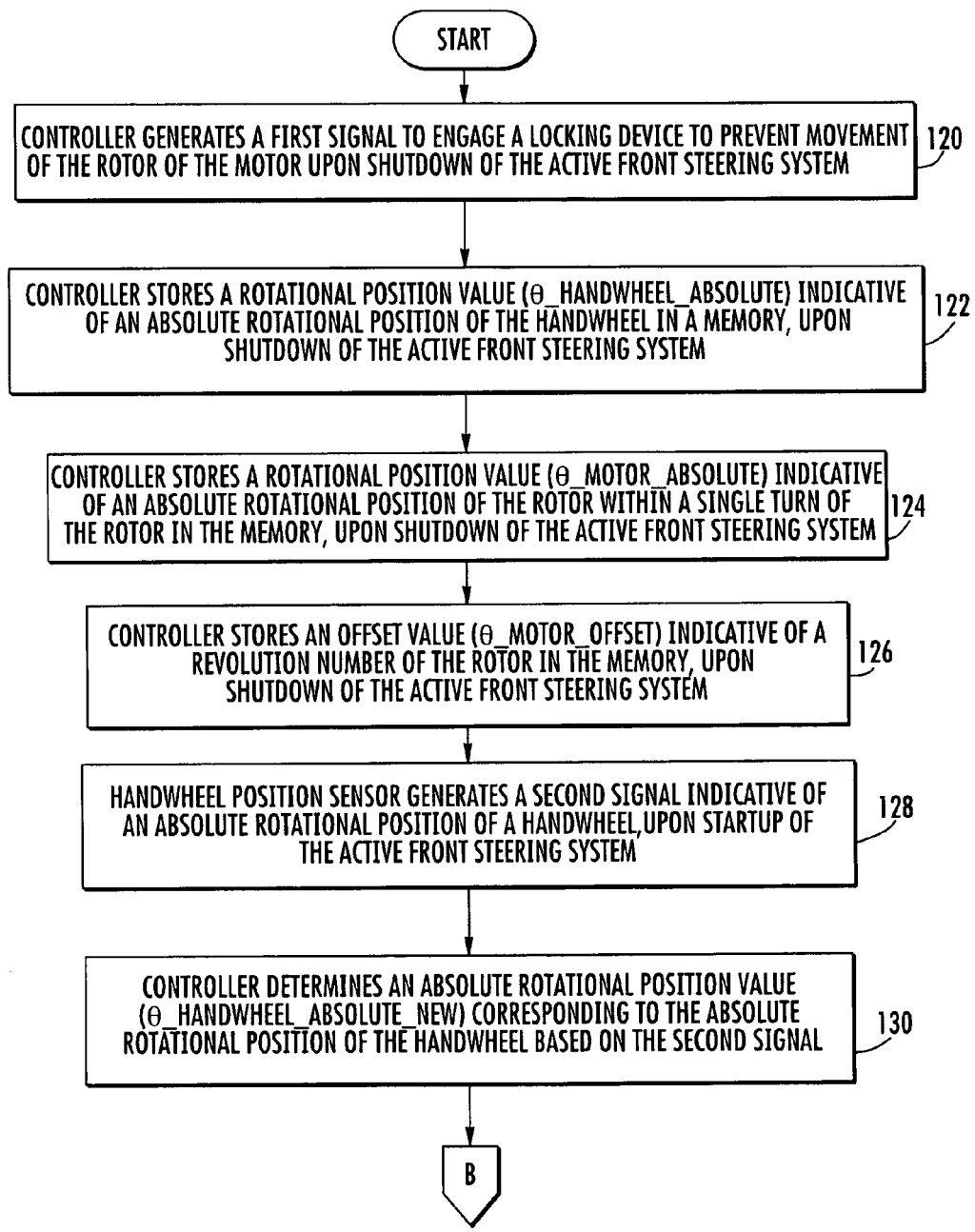
FIGS. 4-7 are flowcharts of another method for determining an absolute rotational position value of a motor in accordance with another exemplary embodiment, utilized in the active front steering system of FIG. 1.
Figure 5:
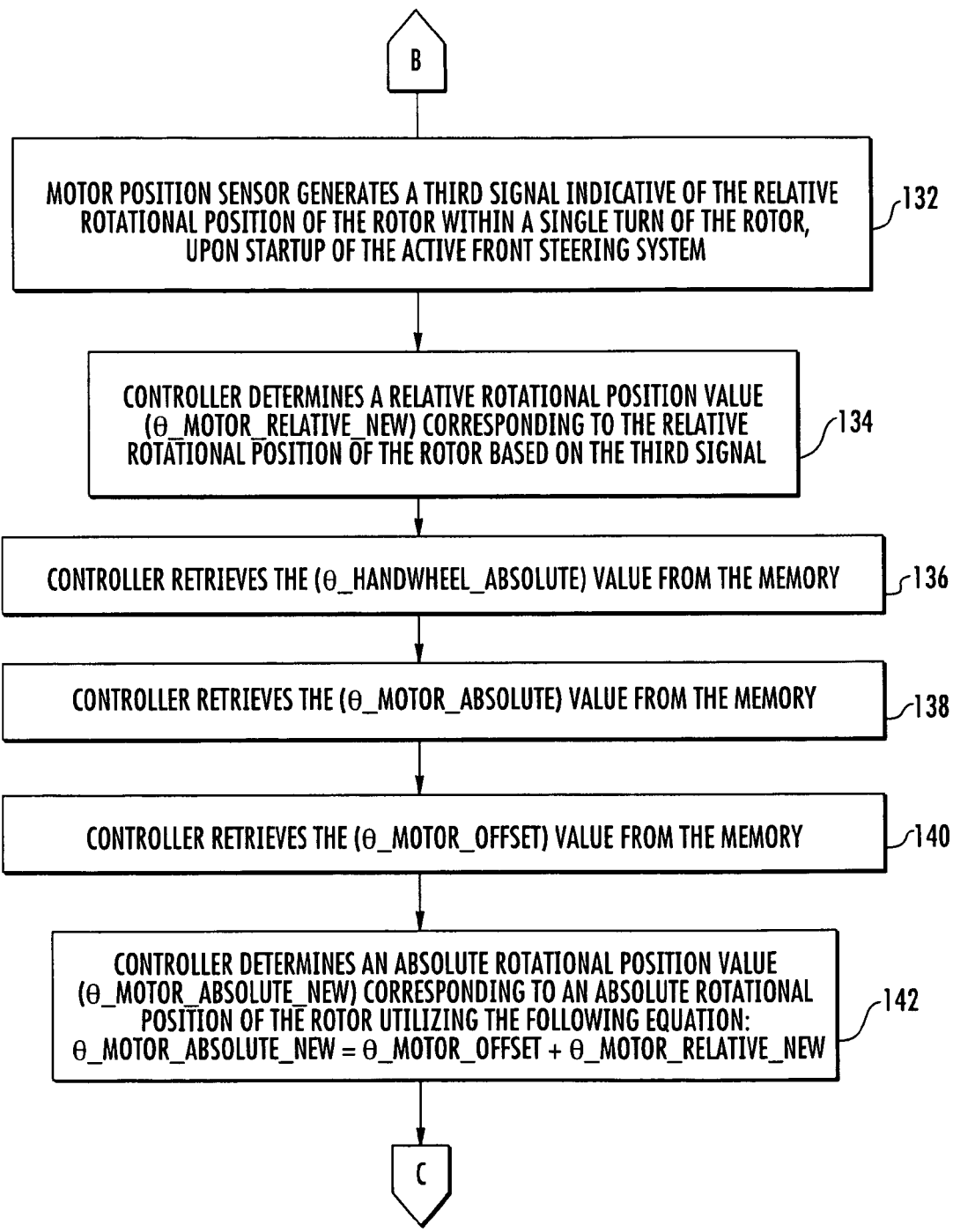
Figure 6:
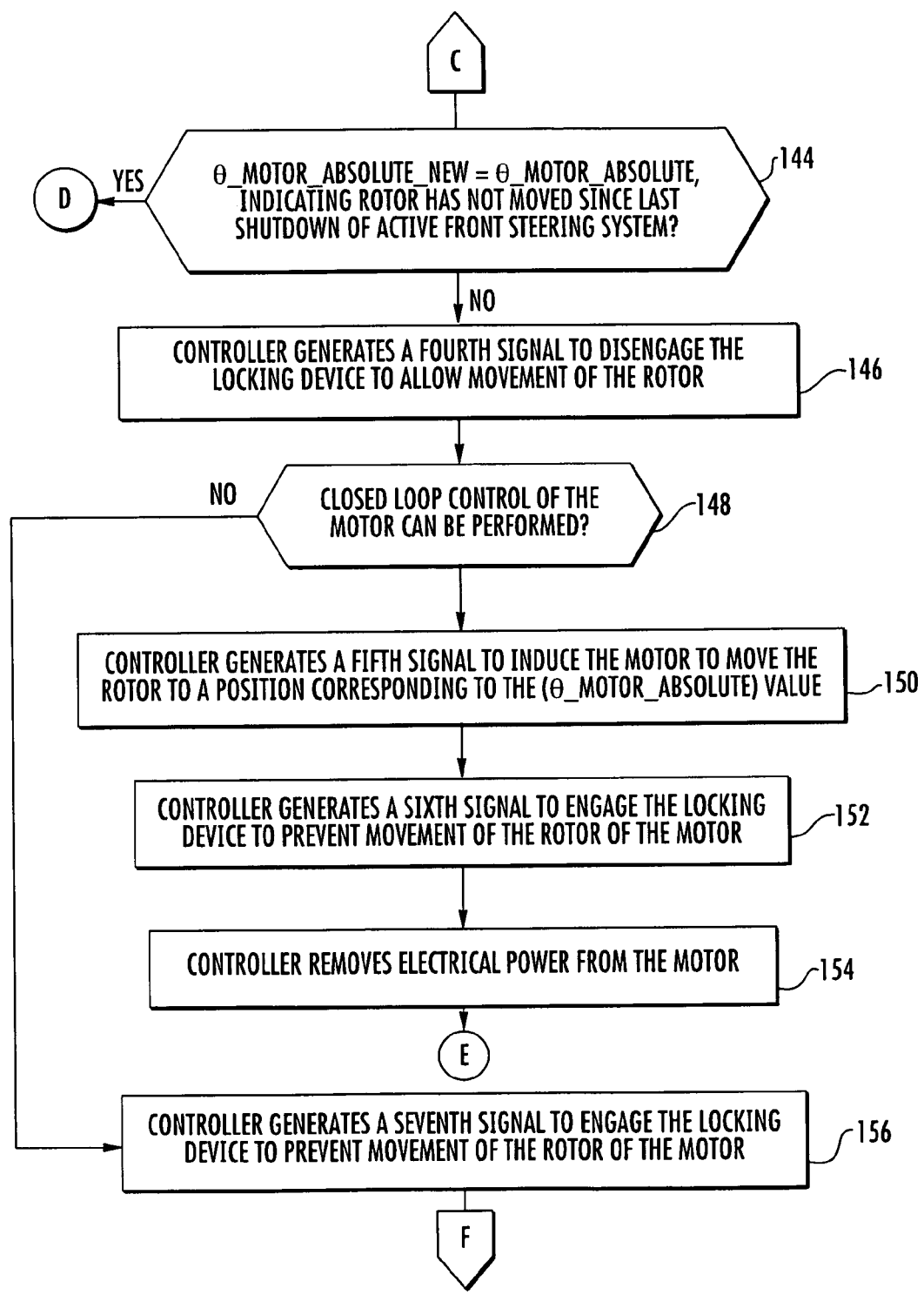
Figure 7:
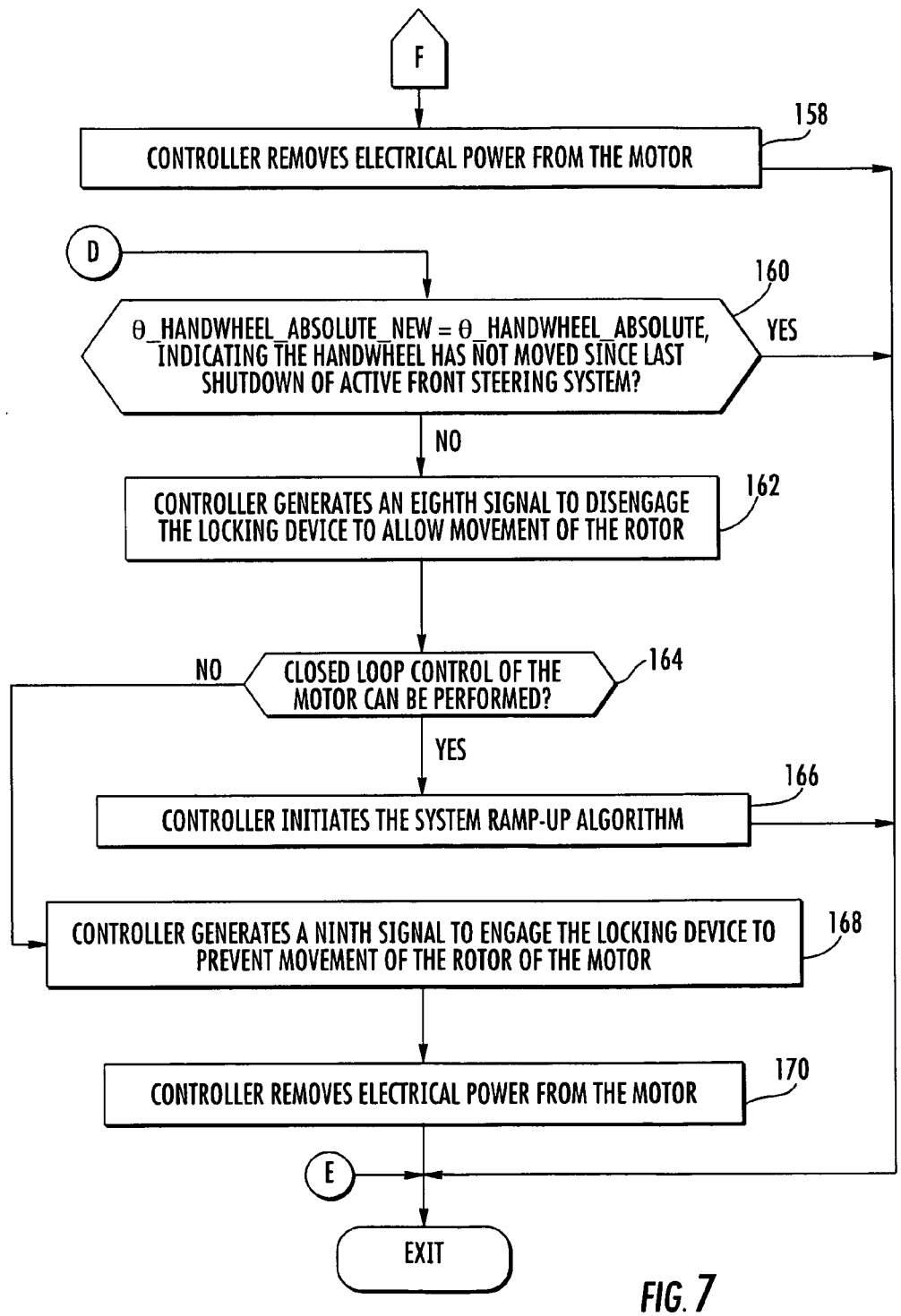

Referring to FIGS. 2-3, a method for determining an absolute position of the rotor 64 in accordance with an exemplary embodiment will be described.

At step 90, the handwheel position sensor 68 generates a first signal indicative of an absolute rotational position of the handwheel 20.

At step 92, the controller 74 determines an absolute rotational position value ($\theta$_Handwheel_Absolute_New) corresponding to the absolute rotational position of the handwheel 20 based on the first signal.

At step 94, the motor position sensor 70 generates a second signal indicative of a relative rotational position of the rotor 64 of the motor 62.

At step 96, the controller 74 determines a relative rotational position value ($\theta$_Motor_Relative_New) corresponding to the relative rotational position of the rotor 64 based on the second signal.

At step 98, the pinion position sensor 72 generates a third signal indicative of an absolute rotational position of a pinion member 50.

At step 100, the controller 74 determines an absolute rotational position value ($\theta$_Pinion_Absolute_New) corresponding to the absolute rotational position of the pinion member 50 based on the third signal.

At step 102, the controller 74 determines a position offset value ($\theta$_Motor_Offset) associated with the rotor 64 utilizing the following equation:

$$\theta\_Motor\_Offset=(\theta\_Pinion\_Absolute\_New-(K1*\theta\_Handwheel\_Absolute\_New))/K2;$$

where K1 and K2 are predetermined constants.

At step 104, the controller 74 determines an absolute rotational position value ($\theta$_Motor_Absolute_New) corresponding to an absolute rotation position of the rotor 64 utilizing the following equation:

$$\theta\_Motor\_Absolute\_New=\theta\_Motor\_Relative\_New+\theta\_Motor\_Offset.$$

At step 106, the controller 74 makes a determination as to whether closed loop control of the motor 62 can be performed. If the value of step 106 equals "yes", the method advances to step 108. Otherwise, the method advances to step 110.

At step 108, the controller 74 initiates the system ramp-up algorithm which will be explained in greater detail below. After step 108, the method is exited.

At step 110, the controller 74 removes electrical power from the motor 62. After step 110, the method is exited.

Referring to FIGS. 4-7, a method for determining an absolute position of the rotor 64 in accordance with another exemplary embodiment will be described. The following method can be utilized with an alternative embodiment of the active front steering system 12 that utilizes the handwheel position sensor 68 and the motor position sensor 70, but does not utilize the pinion position sensor 72.

At step 120, the controller 74 generates a first signal to engage a locking device 66 to prevent movement of the rotor 64 of the motor 62 upon shutdown of the active front steering system 12.

At step 122, the controller 74 stores a rotational position value ($\theta$_Handwheel_Absolute) indicative of an absolute rotational position of the handwheel 20 in a memory, upon shutdown of the active front steering system 12.

At step 124, the controller 74 stores a rotational position value ($\theta$_Motor_Absolute) indicative of an absolute rotational position of the rotor 64 within a single turn of the rotor 64 in the memory, upon shutdown of the active front steering system 12.

At step 126, the controller 74 stores an offset value ($\theta$_Motor_Offset) indicative of a revolution number of the rotor 64 in the memory, upon shutdown of the active front steering system 12.

At step 128, the handwheel position sensor 68 generates a second signal indicative of an absolute rotational position of the handwheel 20, upon startup of the active front steering system 12.

At step 130, the controller 74 determines an absolute rotational position value ($\theta$_Handwheel_Absolute_New) corresponding to the absolute rotational position of the handwheel 20 based on the second signal.

At step 132, the motor position sensor 70 generates a third signal indicative of the relative rotational position of the rotor 62 within a single turn of the rotor 62, upon startup of the active front steering system 12.

At step 134, the controller 74 determines a relative rotational position value ($\theta$_Motor_Relative_New) corresponding to the relative rotational position of the rotor 62 based on the third signal.

At step 136, the controller 74 retrieves the ($\theta$_Handwheel_Absolute) value from the memory.

At step 138, the controller 74 retrieves the ($\theta$_Motor_Absolute) value from the memory.

At step 140, the controller 74 retrieves the ($\theta$_Motor_Offset) value from the memory.

At step 142, the controller 74 determines an absolute rotational position value ($\theta$_Motor_Absolute_New) corresponding to an absolute rotational position of the rotor 62 utilizing the following equation:

$$\theta\_Motor\_Absolute\_New=\theta Motor\_Offset+\theta\_Motor\_Relative\_New.$$

At step 144, the controller 74 makes a determination as to whether the $\theta$_Motor_Absolute_New is equal to $\theta$_Motor_Absolute, indicating rotor 62 has not moved since last shutdown of active front steering system 12. If the value of step 144 equals "yes", the method advances to step 160. Otherwise, the method advances to step 146.

At step 146, the controller 74 generates a fourth signal to disengage the locking device 66 to allow movement of the rotor 62.

At step 148, the controller 74 makes a determination as to whether closed loop control of the motor 62 can be performed. If the value of step 148 equals "yes", the method advances to step 150. Otherwise, the method advances to step 156.

At step 150, the controller 74 generates a fifth signal to induce the motor 62 to move the rotor 64 to a position corresponding to the (θ_Motor_Absolute) value.

At step 152, the controller 74 generates a sixth signal to engage the locking device 66 to prevent movement of the rotor 64 of the motor 62.

At step 154, the controller 74 removes electrical power from the motor 62. After step 154, the method is exited.

Referring again to step 148, when the value of step 148 equals "no", the method advances to step 156. At step 156, the controller 74 generates a seventh signal to engage the locking device 66 to prevent movement of the rotor 64 of the motor 62.

At step 158, the controller 74 removes electrical power from the motor 62. After step 158, the method is exited.

Referring again to step 144, when the value of step 144 equals "yes", the method advances to step 160. At step 160, the controller 74 makes a determination as to whether the θ_Handwheel_Absolute_New is equal to θ_Handwheel_Absolute, indicating the handwheel 20 has not moved since last shutdown of active front steering system 12.

At step 162, the controller 74 generates an eighth signal to disengage the locking device 66 to allow movement of the rotor 64.

At step 164, the controller 74 makes a determination as to whether closed loop control of the motor 62 can be performed. If the value of step 164 equals "yes," the method advances to step 166. Otherwise, the method advances to step 168.

At step 166, controller 74 initiates the system ramp-up algorithm which will be explained in greater detail below. After step 166, the method is exited.

Referring again to step 164, when the value of step 164 equals "no", the method advances to step 168. At step 168, the controller 74 generates a ninth signal to engage the locking device 66 to prevent movement of the rotor 64 of the motor 62.

At step 170, the controller 74 removes electrical power from the motor 62. After step 170, the method is exited.

Figure 8:
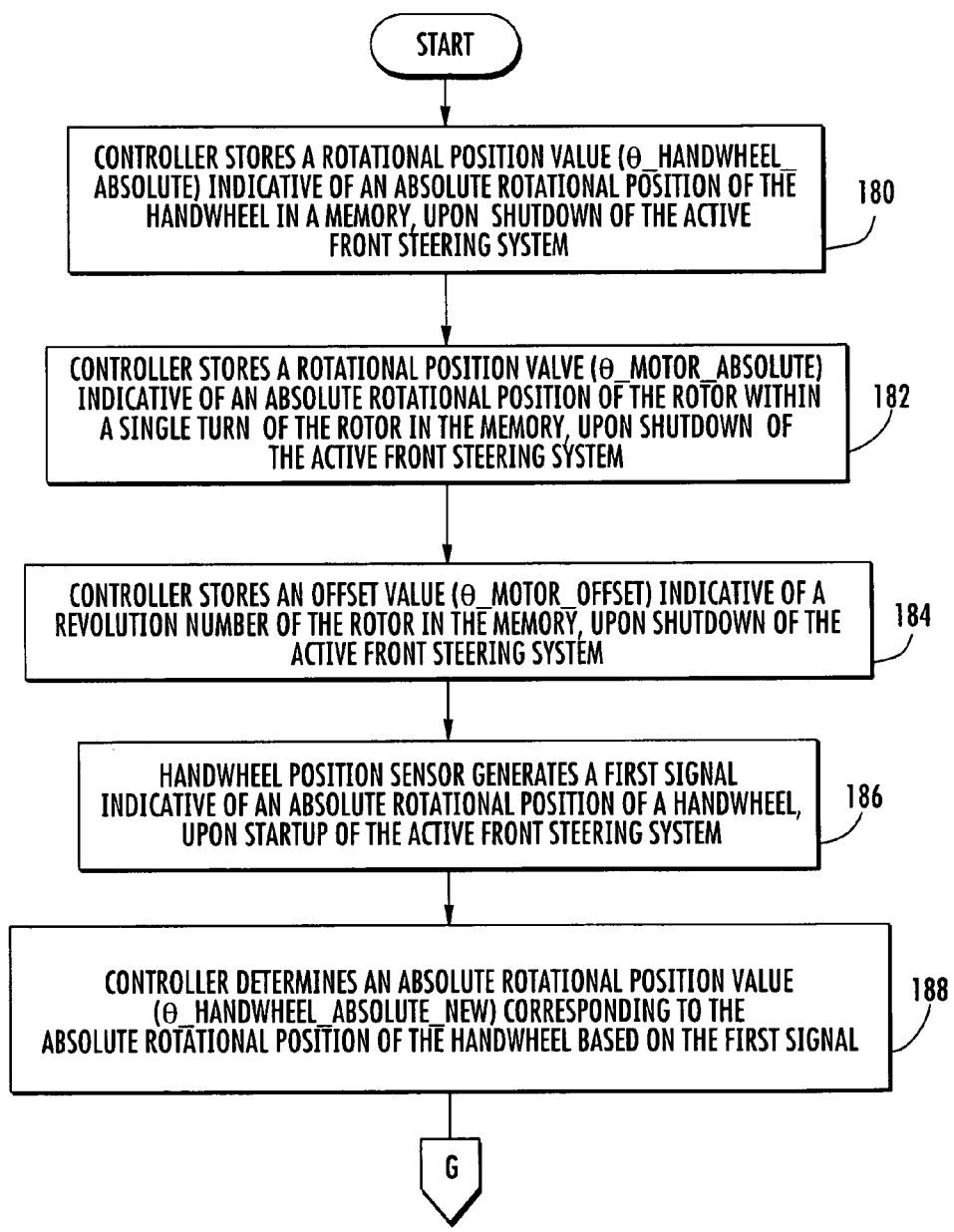
FIGS. 8-10 are flowcharts of another method for determining an absolute rotational position value of a motor in accordance with another exemplary embodiment, utilized in the active front steering system of FIG. 1.
Figure 9:
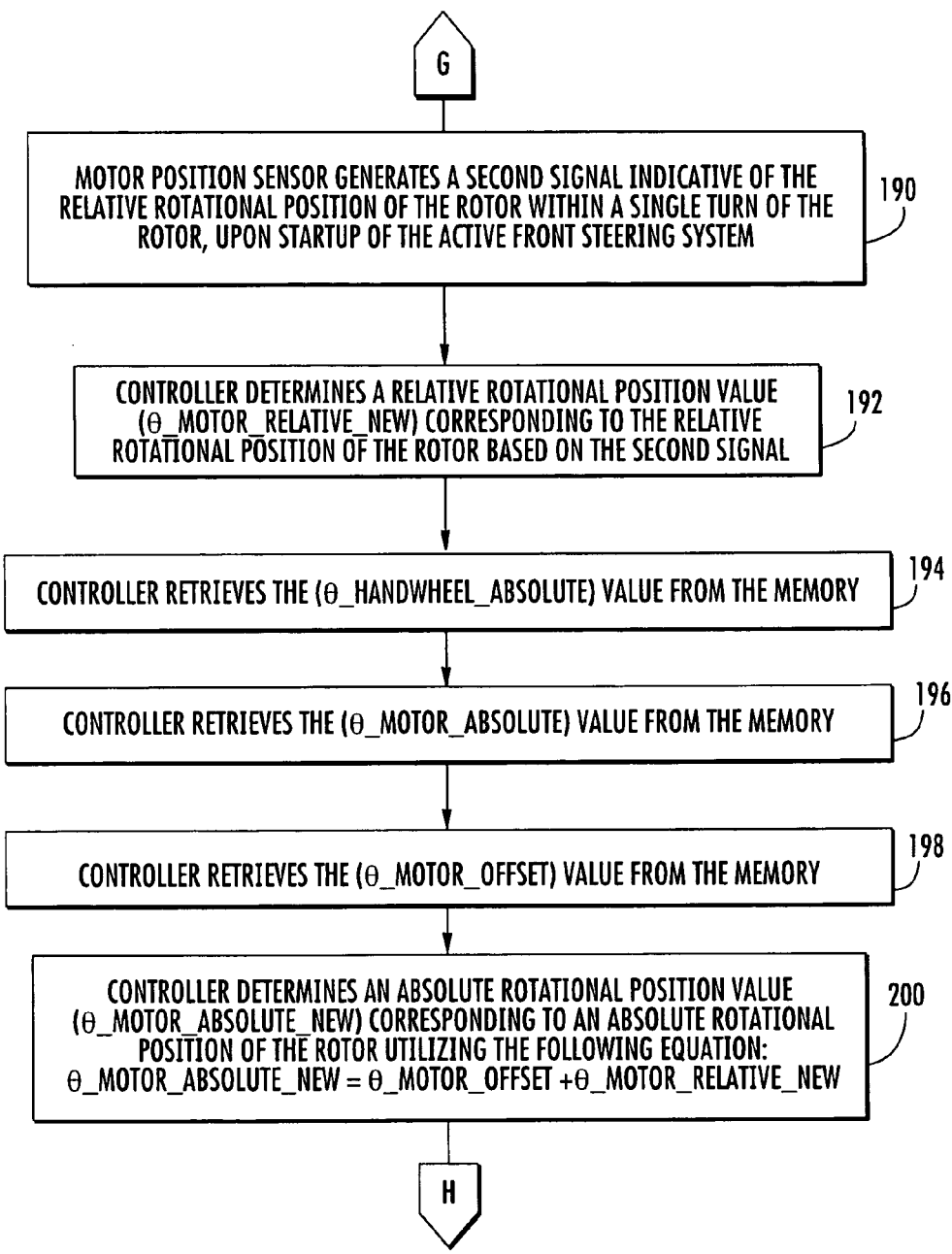
Figure 10:
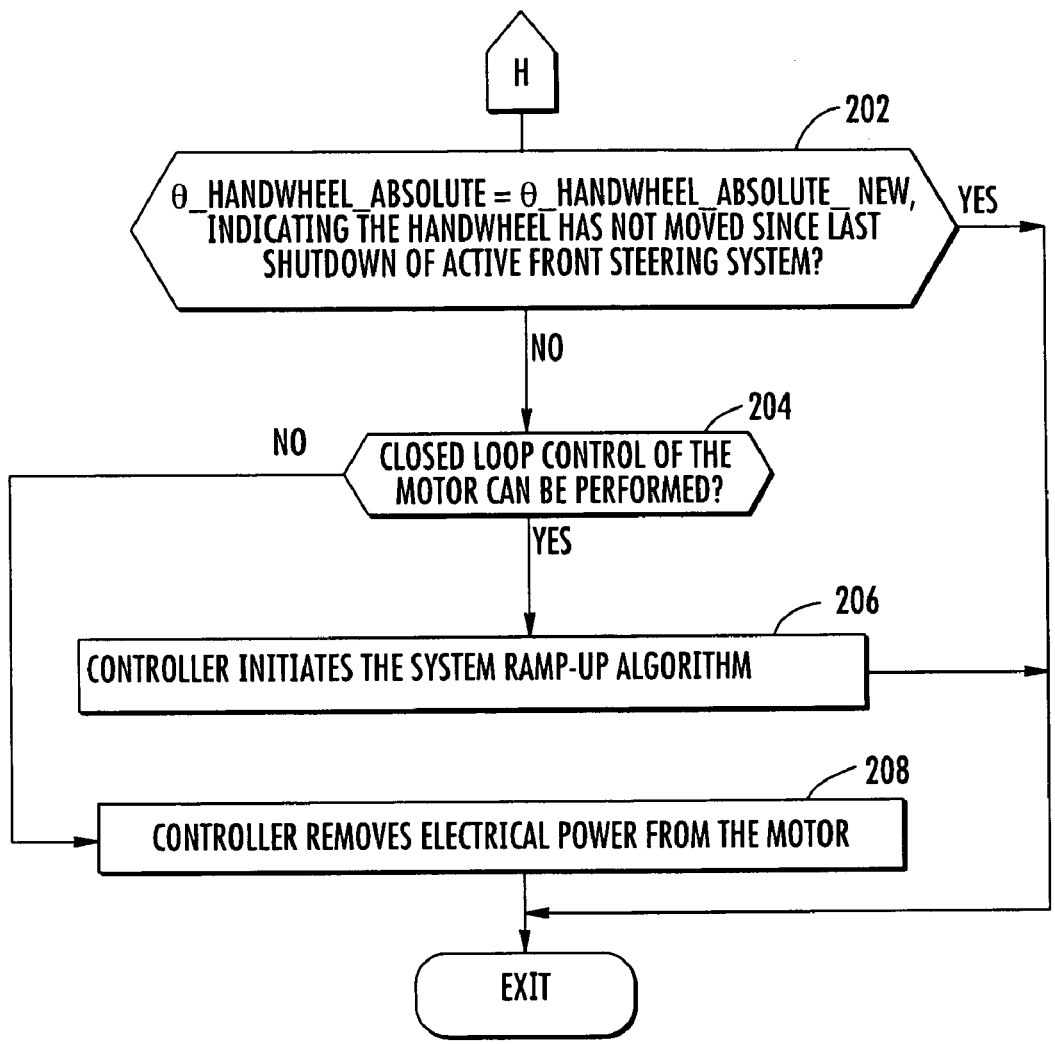

Referring to FIGS. 8-10, a method for determining an absolute position of the rotor 64 in accordance with another exemplary embodiment will be described. The following method can be utilized with an alternative embodiment of the active front steering system 12 that utilizes the handwheel position sensor 68 and the motor position sensor 70, but does not utilize the pinion sensor 72 and the locking device 66.

At step 180, the controller 74 stores a rotational position value (θ_Handwheel_Absolute) indicative of an absolute rotational position of the handwheel 20 in a memory, upon shutdown of the active front steering system 12.

At step 182, the controller 74 stores a rotational position value (θ_Motor_Absolute) indicative of an absolute rotational position of the rotor 64 within a single turn of the rotor 64 in the memory, upon shutdown of the active front steering system 12.

At step 184, the controller 74 stores an offset value (θ_Motor_Offset) indicative of a revolution number of the rotor 64 in the memory, upon shutdown of the active front steering system 12.

At step 186, the handwheel position sensor 68 generates a first signal indicative of an absolute rotational position of the handwheel 20, upon startup of the active front steering system 12.

At step 188, the controller 74 determines an absolute rotational position value (θ_Handwheel_Absolute_New) corresponding to the absolute rotational position of the handwheel 20 based on the first signal.

At step 190, the motor position sensor 70 generates a second signal indicative of the relative rotational position of the rotor 64 within a single turn of the rotor 64, upon startup of the active front steering system 12.

At step 192, the controller 74 determines a relative rotational position value (θ_Motor_Relative_New) corresponding to the relative rotational position of the rotor 64 based on the second signal.

At step 194, the controller 74 retrieves the (θ_Handwheel_Absolute) value from the memory.

At step 196, the controller 74 retrieves the (θ_Motor_Absolute) value from the memory.

At step 198, the controller 74 retrieves the (θ_Motor_Offset) value from the memory.

At step 200, the controller 74 determines an absolute rotational position value (θ_Motor_Absolute_New) corresponding to an absolute rotational position of the rotor 64 utilizing the following equation:

$$\theta\_Motor\_Absolute\_New = \theta\_Motor\_Offset + \theta\_Motor\_Relative\_New.$$

At step 202, the controller 74 makes a determination as to whether the θ_Handwheel_Absolute is equal to θ_Handwheel_Absolute_New, indicating the handwheel 20 has not moved since last shutdown of active front steering system 12. If the value of step 202 equals "yes", the method is exited. Otherwise, the method advances to step 204.

At step 204, the controller 74 makes a determination as to whether closed loop control of the motor 62 can be performed. If the value of step 204 equals "yes," the method advances to step 206. Otherwise, the method advances to step 208.

At step 206, the controller 74 initiates the system ramp-up algorithm which will be explained in greater detail below. After step 206, the method is exited.

At step 208, the controller 74 removes electrical power from the motor 62. After step 208, the method is exited.

Figure 11:
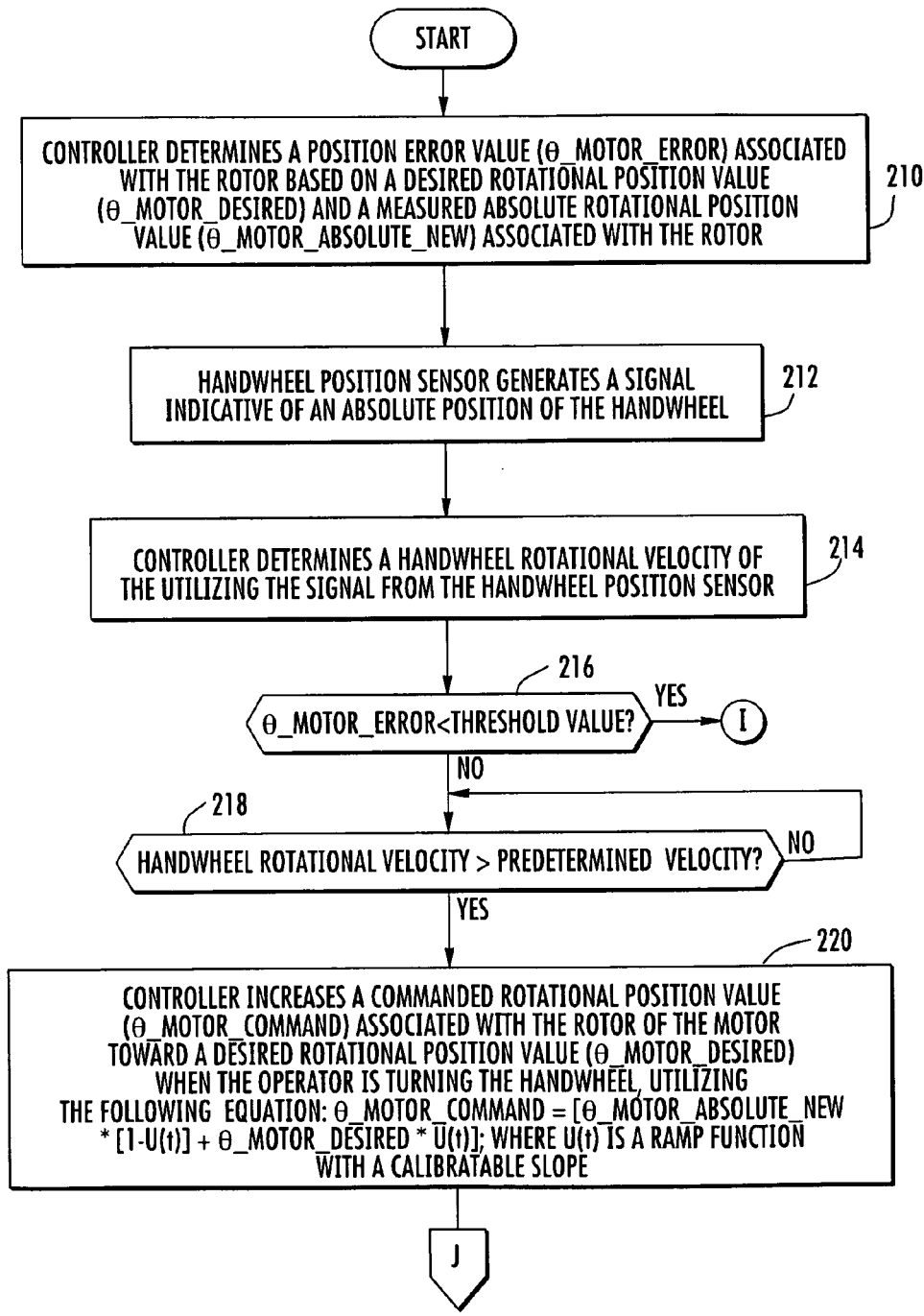
FIG. 11-12 are flowcharts of a method for controlling a motor in the active front steering system of FIG. 1.
Figure 12:
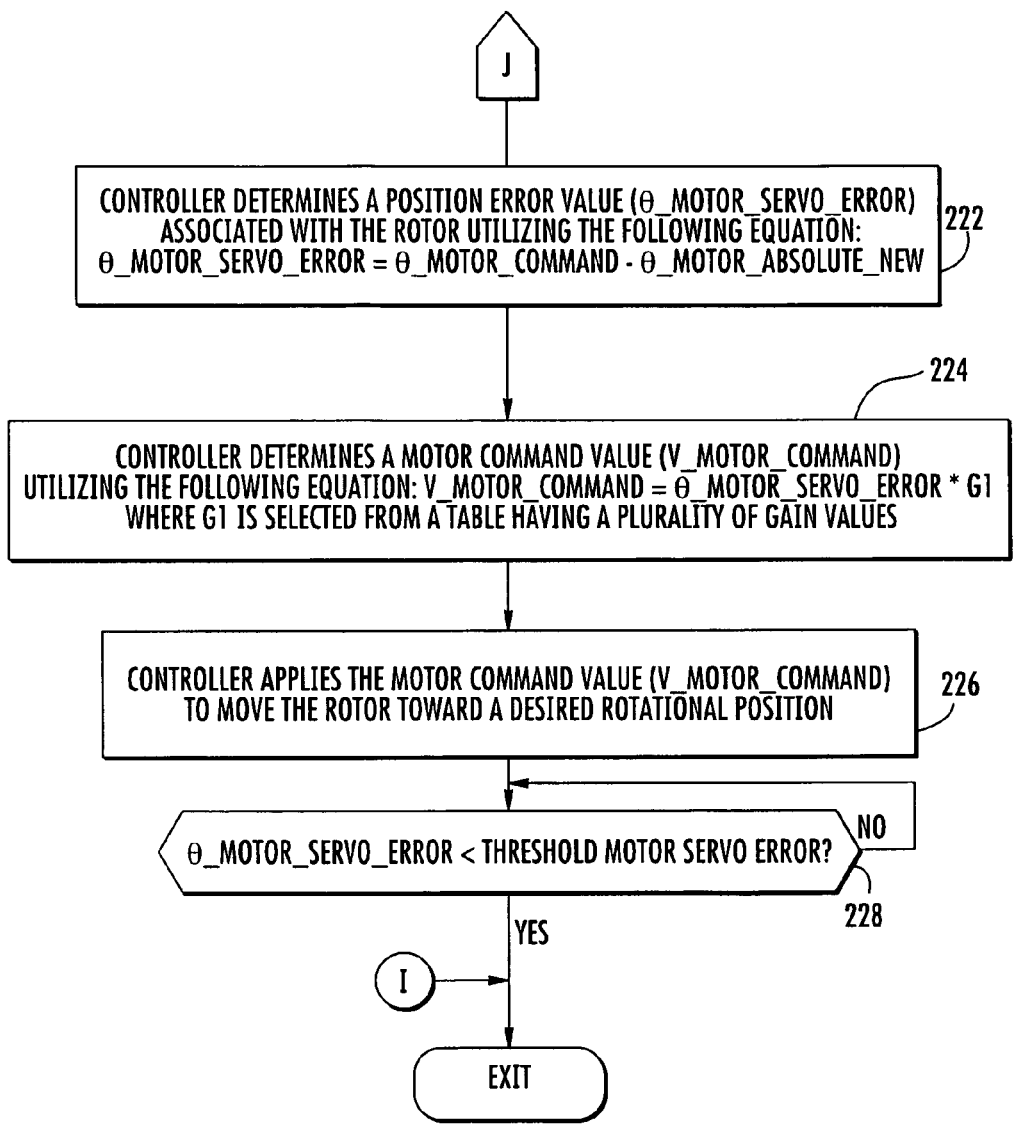

Referring to FIGS. 11-12, a system ramp-up method or algorithm for controlling the active front steering system 12 in accordance with another exemplary embodiment is provided.

At step 210, the controller 74 determines a position error value (θ_Motor_Error) associated with the rotor 64 based on a desired rotational position value (θ_Motor_Desired) and a measured absolute rotational position value (θ_Motor_Absolute_New) associated with the rotor 64.

At step 212, the handwheel position sensor 68 generates a signal indicative of an absolute position of the handwheel 20.

At step 214, the controller 74 determines a handwheel rotational velocity of the utilizing the signal from the handwheel position sensor 68

At step 216, the controller 74 makes a determination as to whether θ_Motor_Error is less then a threshold value. If the value of step 216 equals "yes", the method is exited. Otherwise, the method advances to step 218.

At step 218, the controller 74 makes a determination as to whether the handwheel rotational velocity is greater than a predetermined velocity. If the value of step 218 equals "yes", the method advances to step 220. Otherwise, the method returns to step 218.

At step 220, the controller 74 increases a commanded rotational position value (θ_Motor_Command) associated with the rotor 64 of the motor 62 toward a desired rotational position value (θ_Motor_Desired) when the operator is turning the handwheel 20, utilizing the following equation:

$$\theta\_Motor\_Command = [\theta\_Motor\_Absolute\_New*[1-U(t)] + \theta\_Motor\_Desired*U(t)];$$

where U(t) is a ramp function with a calibratable slope.

At step 222, the controller 74 determines a position error value (θ_Motor_Servo_Error) associated with the rotor 64 utilizing the following equation:

$$\theta\_Motor\_Servo\_Error = \theta\_Motor\_Command - \theta\_Motor\_Absolute\_New.$$

At step 224, the controller 74 determines a motor command value (V_Motor_Command) utilizing the following equation:

$$V\_Motor\_Command = \theta\_Motor\_Servo\_Error*G1,$$

where G1 is selected from a table having a plurality of gain values.

At step 226, the controller 74 applies the motor command value (V_Motor_Command) to move the rotor 64 toward a desired rotational position.

At step 228, the controller 74 makes a determination as to whether the θ_Motor_Servo_Error is less then a threshold motor servo error. If the value of step 228 equals "yes", the method is exited. Otherwise, the method returns to step 228.

The systems and methods for determining an absolute position of motor and an active front steering system provide a substantial advantage over other systems and methods. In particular, the systems and methods provide a technical effect of accurately determining a rotational position of the motor after shutdown of the active front steering system and subsequent activation of the active front steering system.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method for controlling an active front steering system of a vehicle, the active front steering system having a handwheel operably coupled through a gear assembly to an output member, the motor having a rotor operably coupled to the gear assembly for adjusting a position of the output member relative to a position of the handwheel, the method comprising:
   determining a first position error value associated with the rotor based on a desired rotational position value and a measured absolute rotational position value associated with the rotor;
   determining when an operator is turning the handwheel;
   increasing a commanded rotational position value associated with the rotor of the motor toward the desired rotational position value when the operator is turning the handwheel and the first position error value is greater than the threshold value;
   determining a second position error value associated with the rotor based on the commanded rotational position value and a measured absolute rotational position value associated with the rotor;
   determining a motor command value based on the second position error value and a predetermined gain value obtained from a plurality of gain values; and
   applying the motor command value to the motor to move the rotor toward a desired rotational position.

2. The method of claim 1, further comprising determining the desired rotational position value based on a handwheel position and a vehicle speed.

3. The method of claim 1, wherein determining when the operator is turning the handwheel comprises:
   generating a plurality of signals in which each signal is indicative of a position of the handwheel; and
   determining a rotational velocity of the handwheel utilizing the plurality of signals; and
   determining when the velocity of the handwheel is greater than a predetermined velocity which is indicative of the operator turning the handwheel.

4. The method of claim 1, wherein increasing the commanded rotational position value associated with the rotor of the motor toward the desired rotational position value comprises gradually increasing the commanded rotational position value utilizing a ramping function.

5. The method of claim 1, wherein the motor command value is determined by multiplying the second position error value by the predetermined gain value.

6. A system for controlling an active front steering active front steering system of a vehicle, the active front steering system having a handwheel operably coupled through a gear assembly to an output member, the motor having a rotor operably coupled to the gear assembly for adjusting a position of an output member relative of a position of the handwheel, the system comprising:
   a controller configured to determine a first position error value associated with the rotor based on a desired rotational position value and a measured absolute rotational position value associated with the rotor, the controller further configured to determine when an operator is turning the handwheel, the controller further configured to increase a commanded rotational position value associated with the rotor of the motor toward the desired rotational position value when the operator is turning the handwheel and the first position error value is greater than the threshold value, the controller further configured to determine a second position error value associated with the rotor based on the commanded rotational position value and a measured absolute rotational position value associated with the rotor, the controller further configured to determine a motor command value based on the second position error value and a predetermined gain value obtained from a plurality of gain values; and
   a motor control circuit operably communicating with the controller, the motor control circuit configured to apply the motor command value to the motor to move the rotor toward a desired rotational position.

* * * * *